United States Patent [19]
Lenz

[11] Patent Number: 6,029,196
[45] Date of Patent: Feb. 22, 2000

[54] AUTOMATIC CLIENT CONFIGURATION SYSTEM

[75] Inventor: Michael A. Lenz, Palo Alto, Calif.

[73] Assignee: Netscape Communications Corporation, Mountain View, Calif.

[21] Appl. No.: 08/878,499

[22] Filed: Jun. 18, 1997

[51] Int. Cl.[7] ................................................. G06F 15/177
[52] U.S. Cl. .......................... 709/221; 709/203; 713/100
[58] Field of Search .......................... 395/200.5, 200.51, 395/200.52, 200.53, 200.54, 651, 652, 653; 713/1, 2, 100; 379/265; 709/203, 208, 209, 210, 220, 221, 222

[56] References Cited

U.S. PATENT DOCUMENTS

| 5,155,847 | 10/1992 | Kirouac et al. ................. | 395/200.51 |
| 5,247,683 | 9/1993 | Holmes et al. ................. | 395/200.51 |
| 5,555,416 | 9/1996 | Owens et al. .................. | 713/100 |
| 5,689,642 | 12/1997 | Harkins et al. ................. | 395/200.37 |
| 5,713,009 | 1/1998 | DeRosa, Jr. et al. ............ | 395/500 |
| 5,729,594 | 3/1998 | Klingman ...................... | 379/93.12 |
| 5,732,218 | 3/1998 | Bland et al. ................... | 395/200.54 |
| 5,734,831 | 3/1998 | Sanders ......................... | 395/200.53 |
| 5,752,042 | 5/1998 | Cole et al. ..................... | 707/203 |
| 5,774,552 | 6/1998 | Grimmer ........................ | 380/25 |
| 5,805,897 | 9/1998 | Glowny ......................... | 395/712 |
| 5,898,772 | 4/1999 | Connors et al. ................. | 379/265 |

Primary Examiner—Dung C. Dinh
Attorney, Agent, or Firm—Michael A. Glenn; Kirk D. Wong

[57] ABSTRACT

An automatic client configuration system provides a system administrator with the ability to configure every client in a network with one file which resides on the server, and which contains information for setting the client's lock files, preferences, configuration information, and software versions. Control over logical groupings of clients is possible using separate configuration files for each group. The configuration of the network clients is performed during runtime, is automatic, and can be initiated by either the client or the server. The client contacts the server at startup for configuration information, which returns the configuration file that is used by the client to configure its system. The administrator uses the server to query the clients in the network for information, such as file version numbers. If the server determines that any of the clients need file updates, it sends the files to the specific client, which replaces the existing files with the new files sent by the server.

24 Claims, 12 Drawing Sheets

AUTOMATIC CLIENT CONFIGURATION SYSTEM

BACKGROUND OF THE INVENTION

1. Technical Field

The invention relates to the configuration of client preferences and settings in a computer environment. More particularly, the invention relates to the automatic configuration of client preferences, settings and software through a server across a computer network.

2. Description of the Prior Art

Large computer networks have created many headaches for network administrators. The early networked systems required constant attention from the administrators to maintain the operational integrity of the machines attached to the network.

This is still true in many respects for current networked systems. If any network clients need to be updated, the administrator must visit each machine personally and manually update preferences and settings. Software updates may sometimes be updated through the internal network, but many times must be tended manually by the administrator at the specific machine.

Other items such as the Internetwork Processor (IP) address must be set dynamically at the point in time when the client first appears on the network. The addresses are typically managed at run-time to avoid any duplication and resulting packet problems. The Dynamic Host Configuration Protocol (DHCP) specifies that a server may dynamically set a client's IP address. The IP address is specified by the local server at runtime when the client first appears on the internal network. The client receives the IP address and never speaks to the server again until the client restarts.

This approach falls short of providing an easier solution for the system administrator with respect to other aspects of system maintenance. The time and labor involved with manual updates and configuration of network clients has become overly burdensome to the network administrator.

It would be advantageous to provide an automatic client configuration system that allows the network administrator to configure and manipulate network client machines for items such as program preferences and settings as well as software version updates. It would further be advantageous to provide an automatic client configuration system that is centralized at the server and is easily operated and configured by the administrator with minimal effort.

SUMMARY OF THE INDENTION

The invention provides an automatic client configuration system. The invention utilizes an efficient, easily managed and operated centralized configuration file system that allows the user to configure an entire network of clients from a centralized server.

The automatic client configuration system provides the system administrator with the ability to configure every client in a network with one file. The file resides on the server and contains information for setting the client's lock files, e.g. preferences, configuration information, and software versions. Control over logical groupings of clients is possible using separate configuration files for each group.

The configuration of the network clients is performed during runtime and is automatic. The sequence can be initiated by either the client or the server. The client, upon startup, contacts the server for configuration information. The server returns the configuration file which is used by the client to configure its system. The client has a settable timeout that is used for periodic configuration updates. When the timeout expires, the client upon the next subsequent network access, requests the configuration file from the server. Further, separate configuration files may be used to customize groups of clients. However, groups of clients may also be customized with a single configuration file. For example, the file may contain JavaScript logic to query information, e.g platform or release number, from the client making the request and to return configuration data for the specific client.

The administrator uses the server to query the clients in the network for information such as file version numbers. If the server determines that any of the clients need file updates, it sends the files to the specific client. The client replaces the existing files with the new files sent by the server. In the preferred embodiment of the invention, the server does not make queries directly. There are two ways a query can be made, e.g. for the server to query the version of a client component to decide whether to push a software upgrade: a) from the auto-configuration file; or b) from a privileged Web page. Any of these may contain JavaScript logic to query the client version registry.

The invention eases the burden upon the system administrator for system maintenance through centralized control of the network clients. The administrator no longer needs to manually update and configure each client machine in the network.

DETAILED DESCRIPTION OF THE INVENTION

Figure 1:
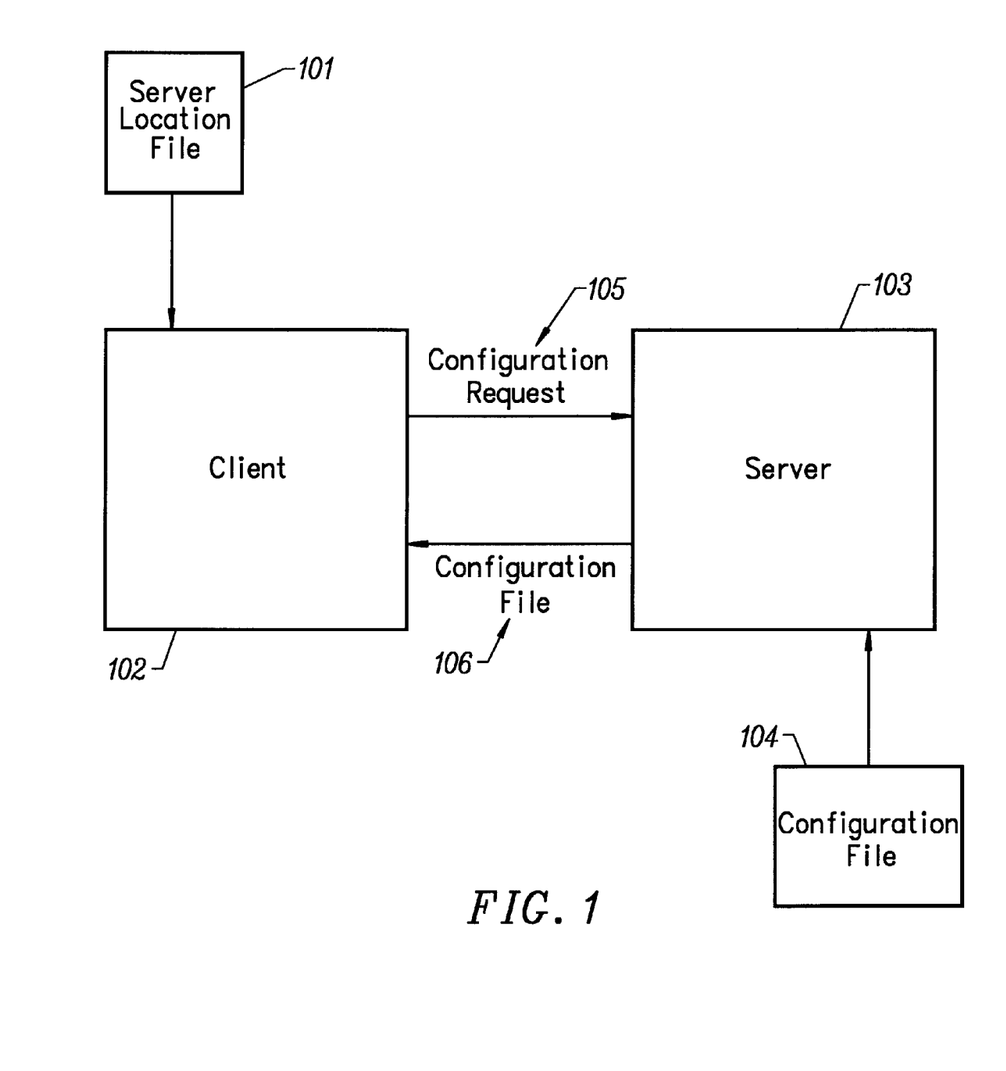
FIG. 1 is a block schematic diagram of the basic invention client/server configuration according to the invention.

Referring to FIG. 1, the Client 102, at start up, is optionally configured through a static server location file 101 that points to the location of a server that is internal to the computer network site. Before the client makes any kind of network connection it first sends a request for configuration 105 to that Server 103. The Server 103 finds the configuration file 104 and sends the configuration file 106 to the Client 102. The file contains commands which tell the Client 102 to perform certain actions such as setting certain preferences and configuration items in the manner that the system administrator specifies. Common examples are setting the user's mail and news server, which is something that is normally entered manually and is error prone. The client 102 executes the configuration file upon receipt.

Figure 2:
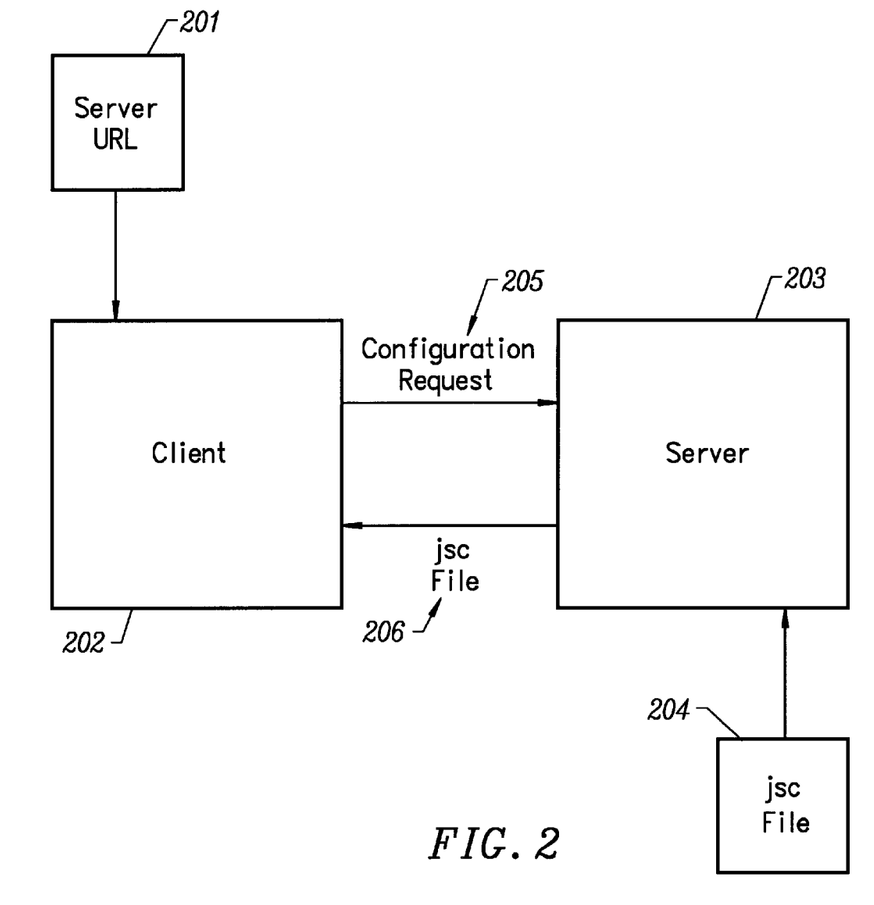
FIG. 2 is a block schematic diagram of a preferred embodiment of an Internet based client/server configuration according to the invention.

With respect to FIG. 2, in a preferred embodiment of the invention, the Client 202 has a static data file which contains the Uniform Resource Locator (URL) of the Server 203. A Java Script Configuration (JSC) file 204 resides on the Server 203. When the Client 202 receives its first request from a user to make a network connection, the Client 202 remembers what connection is being made but before making the connection, it goes to the server URL and requests the configuration file 205, the JSC file 204, that is located on the Server 203. The Server 203 returns the JSC file 206 to the Client 202. The contents of the file are Java script commands which configure various aspects of the Client 202.

Figure 3:
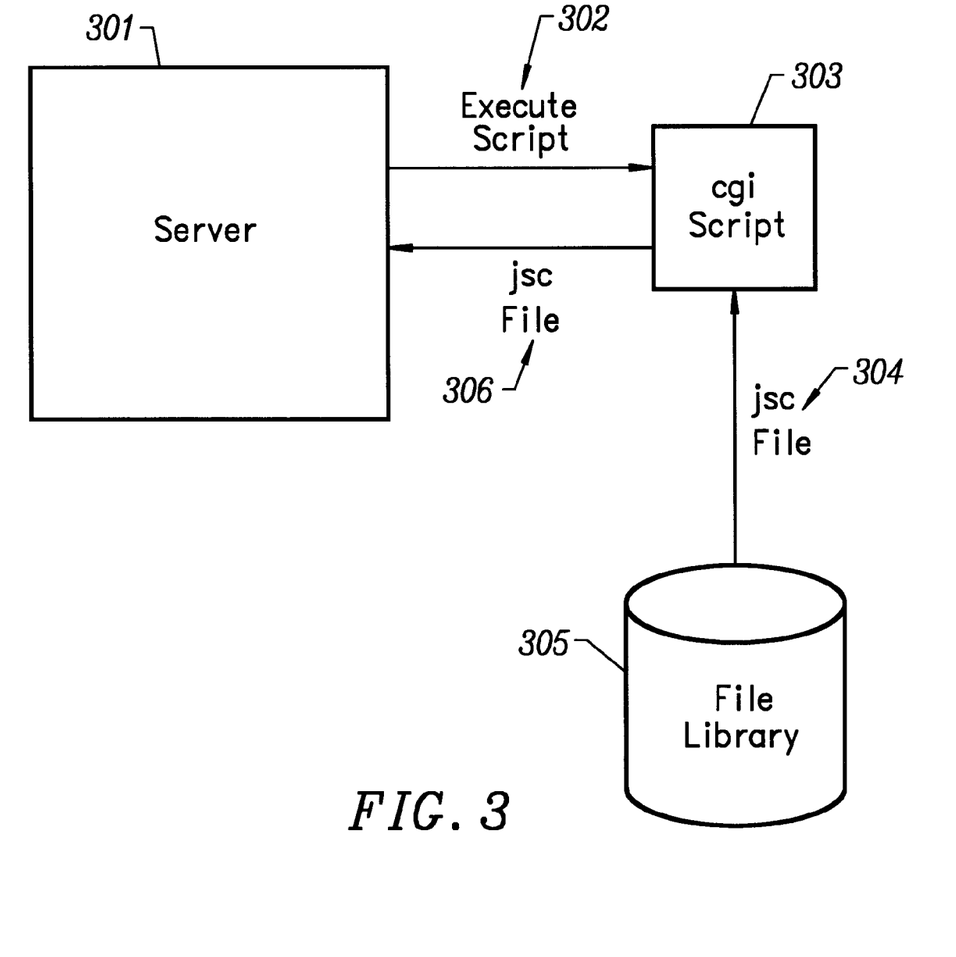
FIG. 3 is a block schematic diagram of a server setup using a Common Gateway Interface (CGI) file according to the invention.

Alternatively, referring to FIG. 3, the Server 301 can have a Common Gateway Interface (CGI) file 303 containing CGI script commands. A CGI file 303 script is used rather than a static file, which means that more dynamic operations can be performed. For example, when the Server 301 is given the user's E-mail address, if there are different settings for a different users, there is a database or file library 305 on the Server 301. The CGI script points into that file library 305 and returns a script tailored for that user. The CGI scripts are executed 302 by the Server 301. The script returns the contents of the JSC file 304, from a file library 305 that corresponds to that particular user. The Server 301 takes the JSC file 306 and sends it to the requesting client.

Figure 4:
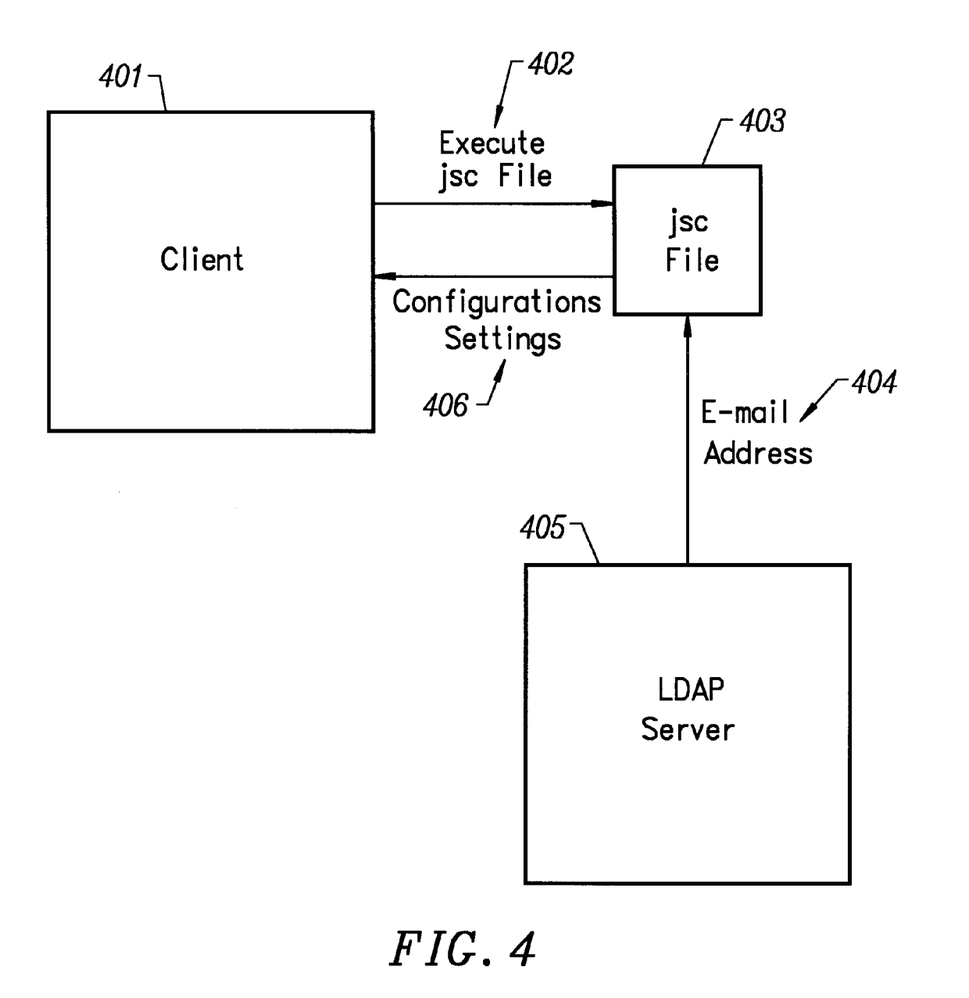
FIG. 4 is a block schematic diagram of a client executing a Java Script Configuration (JSC) file according to the invention.

With respect to FIG. 4, a separate Lightweight Directory Access Protocol (LDAP) server 405 may exist and the JSC file has LDAP commands that make requests to this server 405. The request may be for the user's E-mail address 404 which is used as part of the configuration settings 406 on the Client 401 to set preferences for the Client's 401 Internet browser. Therefore, the JSC file is much more flexible with the addition of LDAP commands that allow set configuration data to be dynamically rather than statically set.

Such embodiment may involve two servers i.e. a server that returns the JSC file, which the client processes; and a second LDAP server to which the client connects after such processing is completed. The E-mail address or user ID is typically passed to the LDAP server at the key to request a given user's settings. Information returned may include other settings, such as the user's mail server name.

One skilled in the art will readily appreciate that, although many facets of the Internet are mentioned as applications for the invention, the same concepts of the invention apply to other applications and fields as well.

A polling option is set up with a command on the client or in the JSC file, where the client every 10 minutes (or any number of minutes) refreshes the JSC file through a request to the server. In this way, the administrator can change the JSC file and have the clients react to those changes when the set amount of time elapses. The client makes the request for the JSC file on the subsequent network connection and refreshes the JSC file upon receipt.

Figure 5:
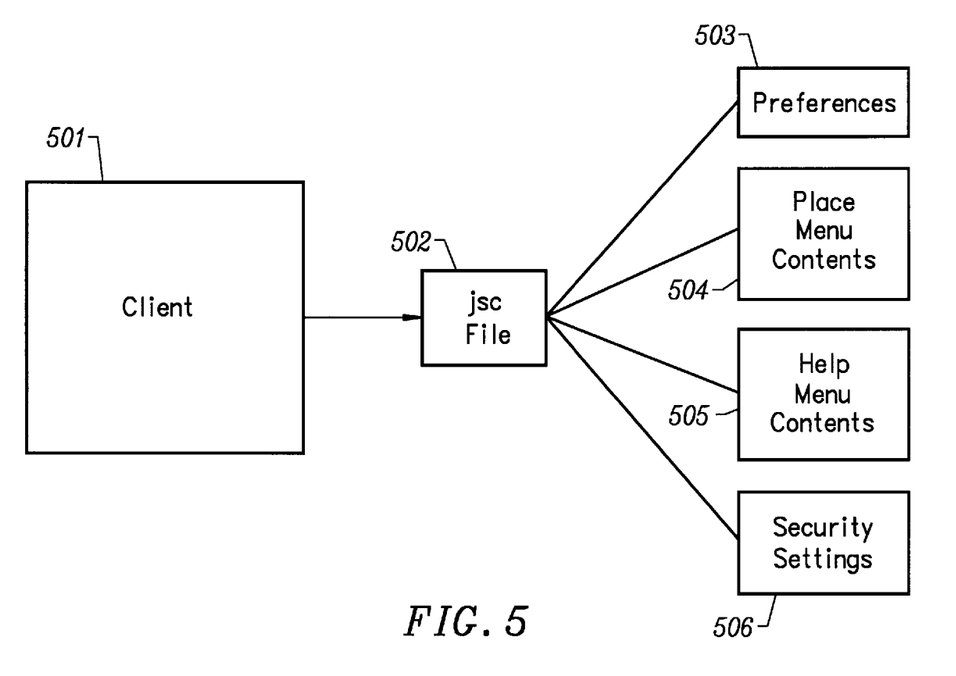
FIG. 5 is a block schematic diagram showing the possible types of information contained in a JSC file according to the invention.

Referring to FIG. 5, the common configuration information contained in the JSC file 502 are preferences 503 that the user can set through the preference user interface and that can be preconfigured by an administrator. The default preferences may be overridden by the user but the administrator can also lock preferences so that the user cannot override them. For example if the administrator wants to disable Java for everyone, he can do so through this mechanism, and thereby prevent the user from turning Java back on.

Another category of configuration information includes items that the user cannot normally change but that the administrator has an interest in changing. For example, on the Netscape browser, the administrator changes the contents of the places menu 504 and the help menu 505, which normally point to certain sites on Netscape's home page. The administrator changes the contents of the help page to point to his organization's own intranet locations and predefines other Internet sites.

Security settings 506 may also be set. These allow the administrator to preconfigure the client to accept certain certificates and to reject certain others. This is useful if the administrator is inside a given organization and presumably wants to accept items that are signed by that organization but does not trust items that are signed by anyone else. This allows the administrator to maintain control over the types of items the users can download.

Figure 6:
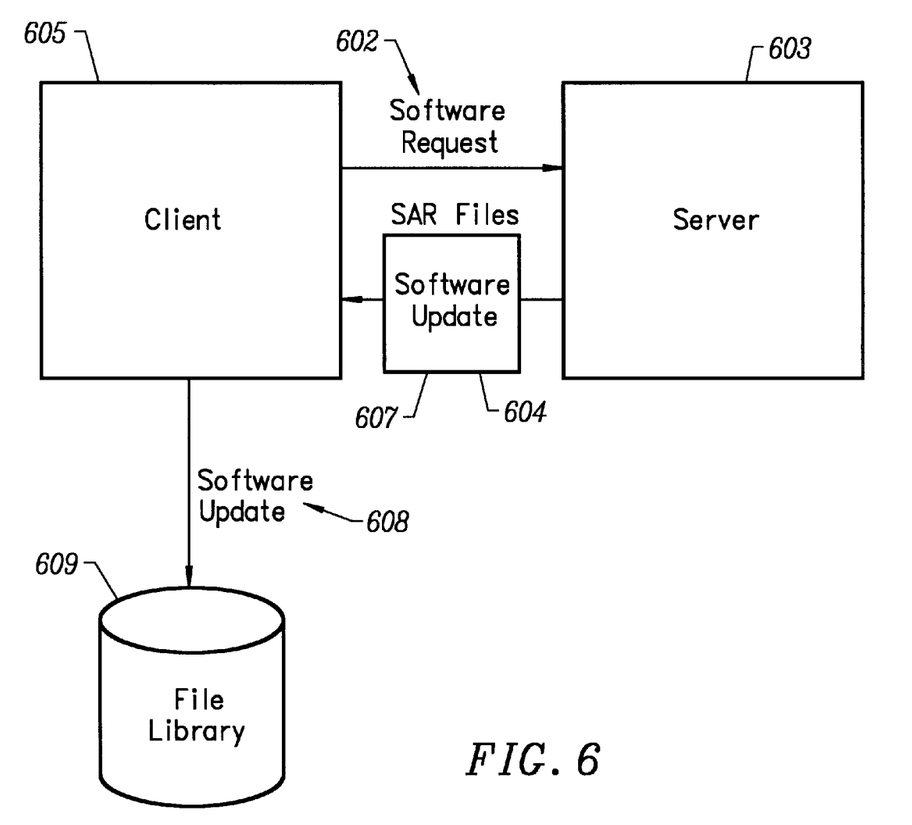
FIG. 6 is a block schematic diagram showing the operation of a Java Archive (JAR) file in a client/server configuration according to the invention.

With respect to FIG. 6, another category of settings in a JSC file is the automatic installation of software. This feature of the invention provides one with the ability to point to a Java Archive (JAR) file, which is a file that automatically downloads and installs itself. This provides a mechanism by which an administrator can automatically push out and update the software that he wants. The JAR file 607 contains a software update 604 which is provided by the server 603 in response to a software request 602 from the Client 605. The software update 608 reaches the Client, and the software update 608 is placed in the software library 609.

To update all of the user configurations, the administrator needs to edit only a single script file on the server and all of the clients automatically configure themselves.

Figure 7:
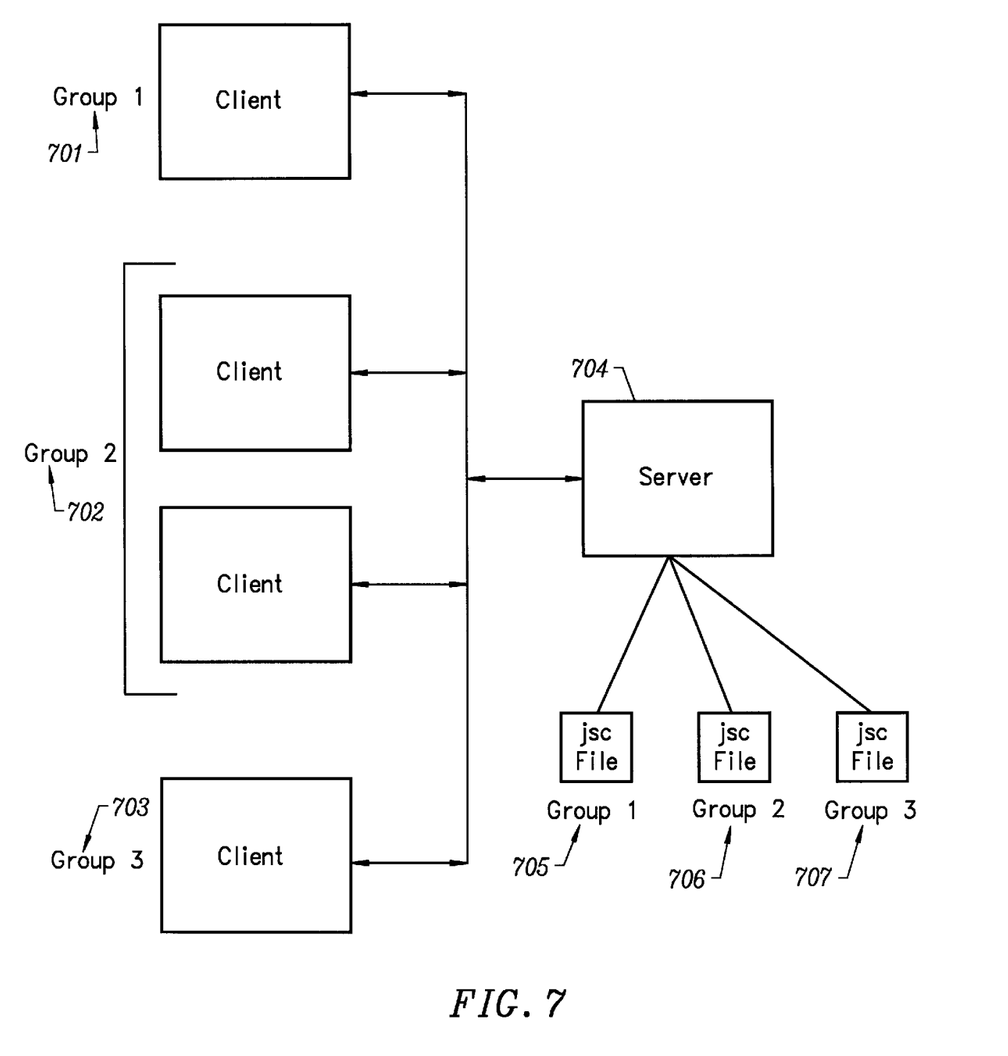
FIG. 7 is a block schematic diagram showing the grouping of clients and their corresponding JSC files in a client/server configuration according to the invention.

Referring to FIG. 7, clients may be grouped together in logical groupings. Group 1 (701) contains one particular client, group 2 has two clients and group 3 has one client. The Server 704 maintains different JSC files for each group. Whenever a client in group 1 (701) makes a configuration request to the Server 704, the Server 704 looks at its JSC files and picks out the specific JSC file for group 1 (705) and forward it to the requesting client. This method applies to grouping clients by machine platforms, e.g. PC, SPARC, and Mac. Further, separate configuration files may be used to customize groups of clients. However, groups of clients may also be customized with a single configuration file. For example, the file may contain JavaScript logic to query information, e.g. platform or release number, from the client making the request and to return configuration data for the specific client.

Figure 8:
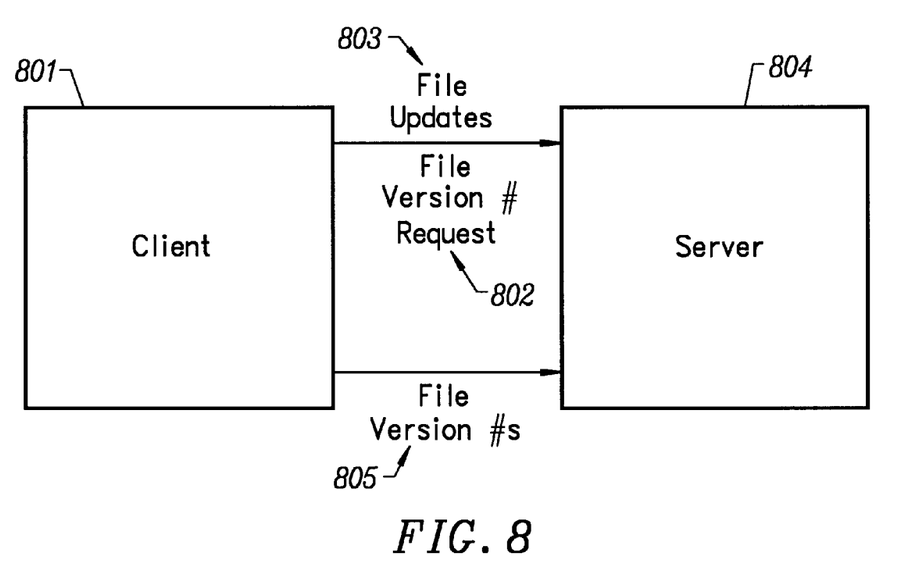
FIG. 8 is a block schematic diagram showing a server-initiated file update sequence of a client according to the invention.

With respect to FIG. 8, the Server 801 can make requests to a Client 804 proactively, such as a request for file version numbers 802. The Client 804 responds with a list of the requested file version numbers 805. The Server 801 processes the list and sends any file updates 803 that are needed to the Client 804. Requests can also include summaries of client privileges for maintaining a permissions database on the Server 801. The centralized ability to maintain and query clients in a network eases the burden on the administrator of manually updating the software and other information on each client's machine. In the preferred embodiment of the invention, the server does not make queries directly. There are two ways a query can be made, e.g. for the server to query the version of a client component to decide whether to push a software upgrade: a) from the auto-configuration file; or b) from a privileged Web page. Any of these may contain JavaScript logic to query the client version registry. The invention also allows users to store their own information, via the same mechanism, on a server from their client. This allows the users to move to different machines and always be able to log in as themselves if they point to that same server. The users can store their own configurations and preferences on a central server instead of only on the local machine, thereby enabling the users to move freely between machines.

Figure 9:
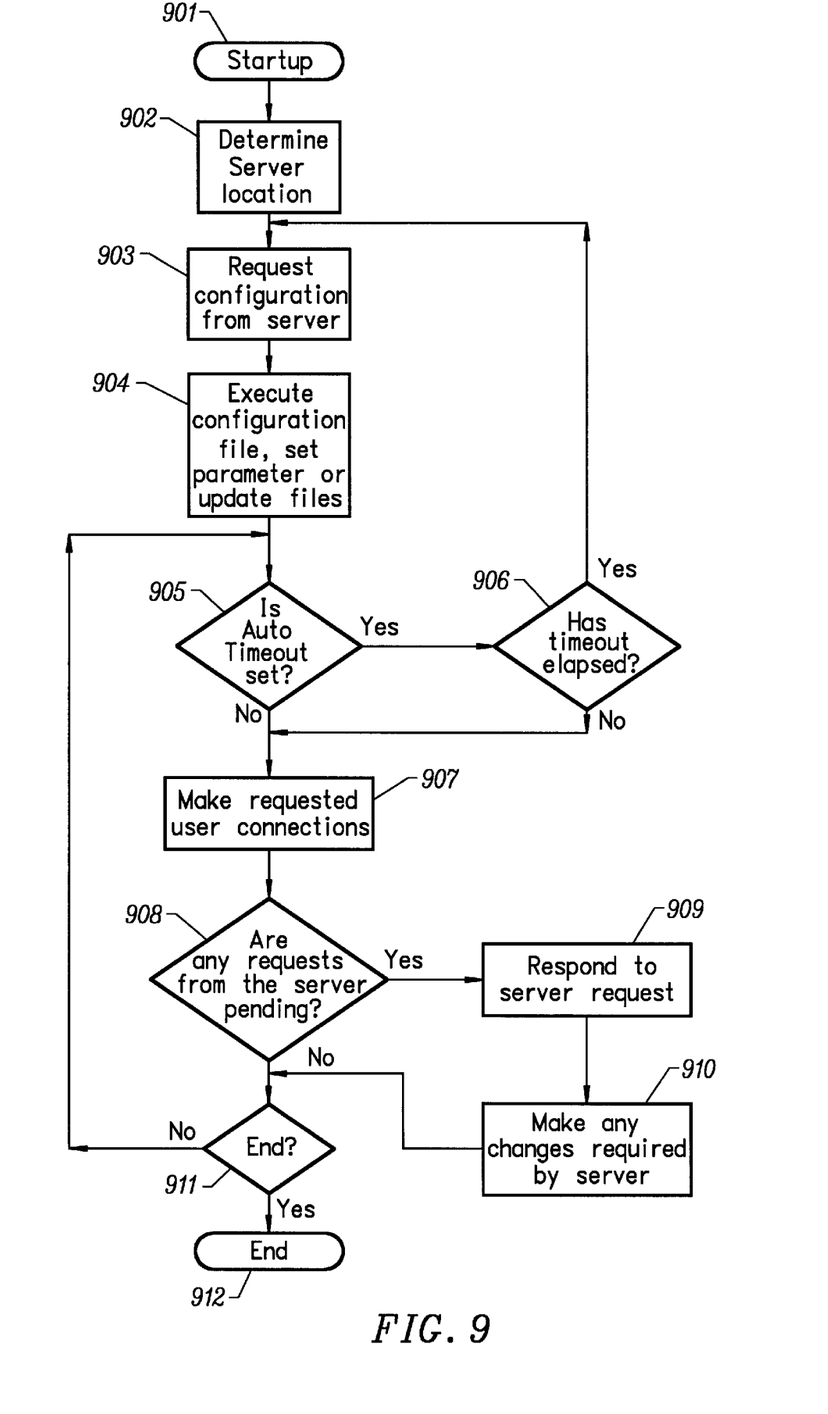
FIG. 9 is a block schematic diagram showing the decision flowchart within a client according to the invention.

Referring to FIG. 9, the client, at startup 901, determines the server location 902. The client then requests for configuration from the server 903 and, upon receipt of the configuration file, executes the file, setting up any parameters or updating any files 904. If the automatic timeout has been set 905, then the timeout value is checked at the time that a user makes a connection request, to see if the timeout has been exceeded 906. If the timeout has been exceeded, the client begins the configuration request 903 sequence again. The user connection request is made 907 after the configuration sequence is completed. Information requests from the server are checked 908 and responded to 909. Server requests may also be handled in configuration files, e.g. between steps 904 and 905 on FIG. 9. Any changes required by the server are made 910. The timeout, user connections and server request sequences are repeated until the program is terminated 911.

Figure 10:
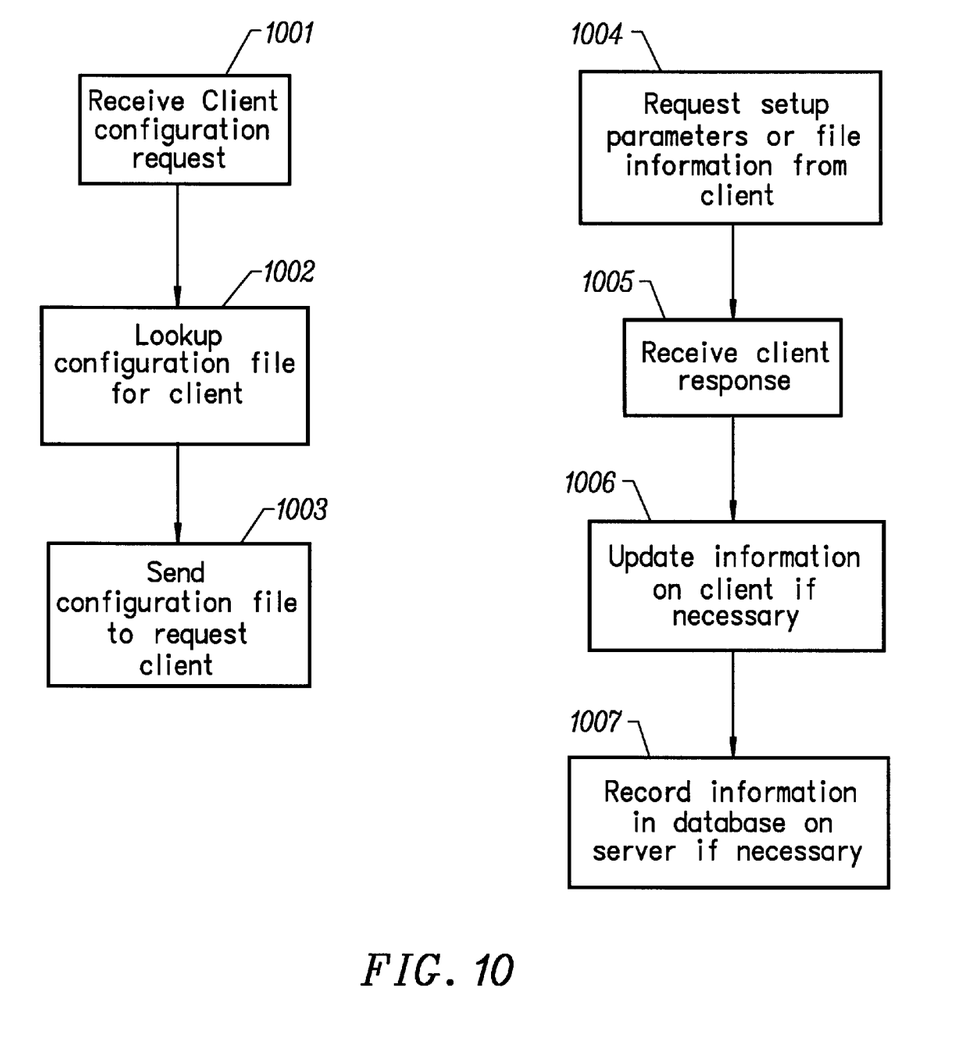
FIG. 10 is a block schematic diagram showing the task decision flowchart within a server according to the invention.

With respect to FIG. 10, the server has two task loops. The client configuration is received 1001 and the configuration file corresponding to the client is retrieved 1002. The configuration file is then sent to the requesting client 1003. The second task involves the server-initiated query and update. The server requests setup parameters or file information from the client 1004. Using the information received from the client 1005, the server sends an update of any information to the client 1006 and records any necessary information in a database for housekeeping records 1007.

Figure 11:
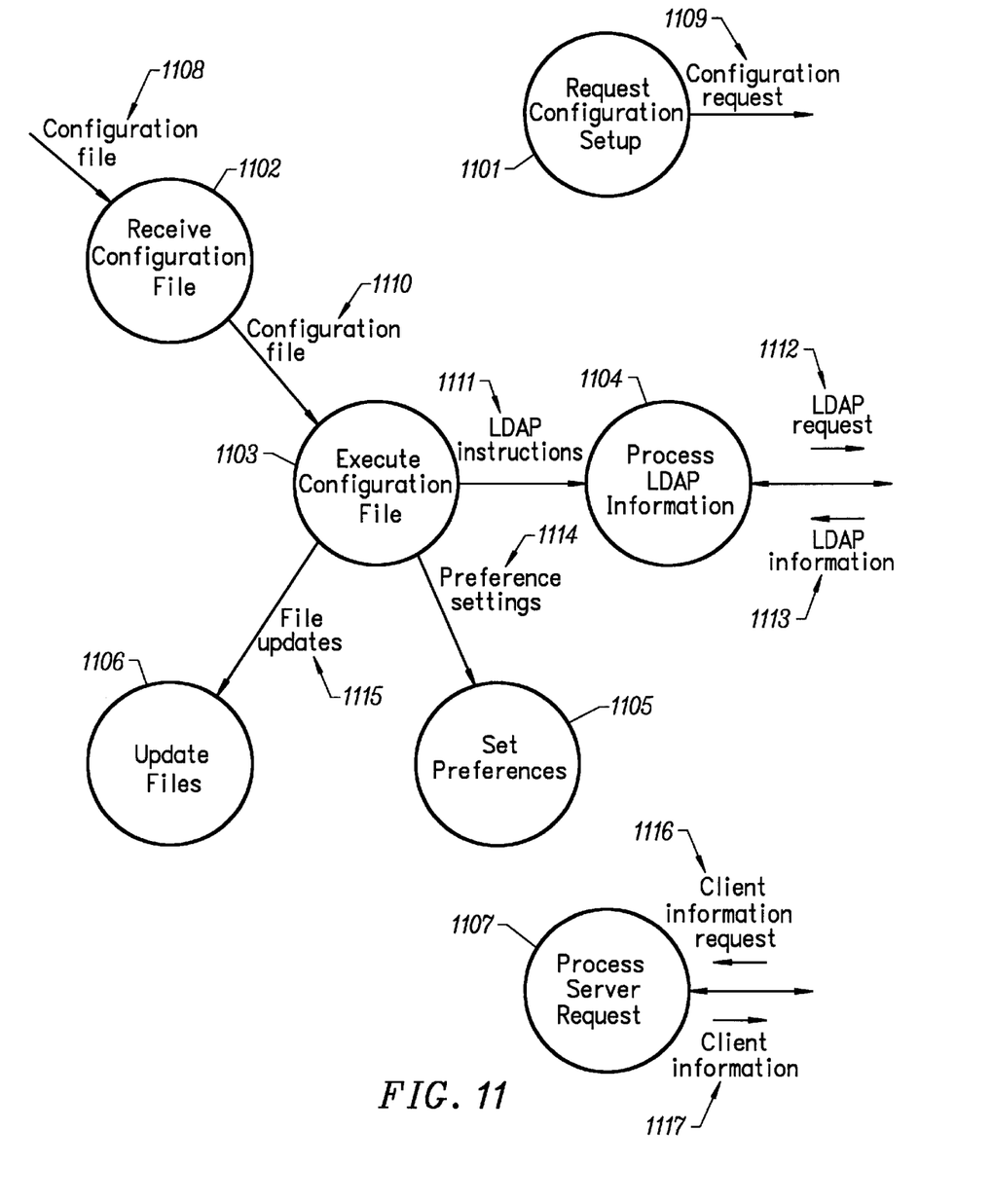
FIG. 11 is a block schematic diagram showing the task modules involved within a client according to the invention.

Referring to FIG. 11, the client module, Request Configuration Setup 1101, sends the configuration requests 1109 to the server. The Receive Configuration module 1102 receives the configuration file 1108 sent by the server. The configuration file 1110 is passed to the Execute Configuration File module 1103 which executes the instruction in the file and distributes the file information to other modules. The Process LDAP Information module 1104 uses the LDAP instructions 1111 to make LDAP information requests 1112 to LDAP servers. The return LDAP information 1113 is then processed by the Process LDAP Information module 1104.

Preference settings 1114 are handled by the Set Preferences module 1105, while any file updates 1115 are made by the Update Files module 1106. Asynchronous server requests for client information 1116 are processed by the Process Server Request module 1107. Any client information 1117 is sent back as a response to the server.

Figure 12:
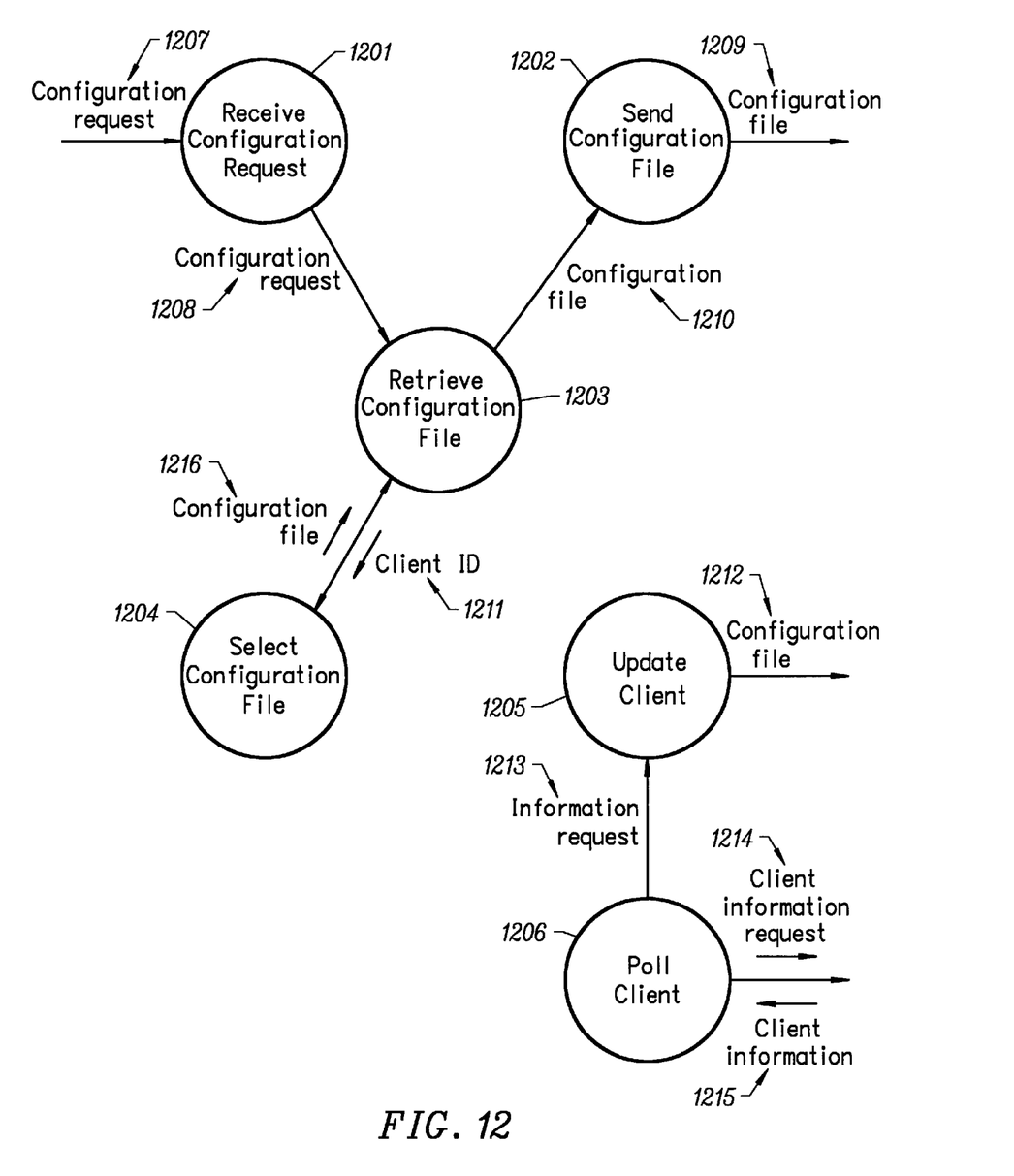
FIG. 12 is a block schematic diagram showing the task modules involved within a server according to the invention.

With respect to FIG. 12, the server module, Receive Configuration Request 1201, receives any client configuration requests 1207. Configuration requests 1208 are passed to the Retrieve Configuration File module 1203 which retrieves the configuration file 1216 from the Select Configuration File module 1204 based on the client ID 1211. The configuration file 1210 is passed to the Send Configuration File module 1202 which sends the configuration file 1209 to the requesting client.

Server-initiated requests are sent by the Poll Client module 1206 which sends requests 1214 to the client and receives the client information responses 1215. The information that was requested 1213 is passed to the Update Client module 1205 which checks for any information discrepancies and sends any appropriate updates through a configuration file 1212 to the client.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A process for automatically configuring computer network clients through a server, comprising the steps of:

creating a data file on a client which contains the Uniform Resource Locator (URL) of said server;

creating configuration files on said server, sending a configuration request from said client to said server, and wherein said request is resent if a configuration file is not received from said server within a predetermined time limit;

identifying the configuration file on said server associated with said client;

sending said configuration file from said server to said client;

configuring various aspects of said client using said configuration file;

allowing users to store their own configuration and preference information on said server from their client, thereby allowing said users to move to different machines and always be able to log in as themselves if they point to that same server;

wherein each configuration file is intended for a specific client or group of clients;

wherein said configuration file allows configuration data to be set dynamically; and wherein said client addresses said server through said URL.

2. The process of claim 1, further comprising the step of:

setting a polling option on said client with a command on said client or in said configuration file.

3. The process of claim 1, wherein said identifying step uses a Common Gateway Interface (CGI) file containing CGI script commands to associate said configuration file with said client.

4. The process of claim 1, further comprising the steps of:

polling said client for information;

receiving said client's response from said poll; and processing said client's response.

5. The process of claim 1, wherein said configuration file contains file update information.

6. The process of claim 1, wherein said configuration file contains preference and lock file settings.

7. The process of claim 1, wherein said client periodically refreshes said configuration file through a request for said configuration file to said server.

8. The process of claim 1, further comprising the steps of:

processing Lightweight Directory Access Protocol (LDAP) instructions contained in said configuration file on said client;

requesting information from an LDAP server on said client across a computer network;

receiving LDAP information from said LDAP server on said client; and processing said LDAP information on said client.

9. The process of claim 1, further comprising the step of: setting preferences according to said configuration file on said client.

10. The process of claim 1, further comprising the step of: updating files according to said configuration file on said client.

11. The process of claim 4, further comprising the steps of:

receiving said poll from said server on said client;

processing said poll on said client; and responding to said poll with said requested information on said client.

12. The process of claim 1, wherein said configuration file is a Javascript Configuration (JSC) file.

13. An apparatus for automatically configuring computer network clients through a server, comprising:

a data file on a client which contains the Uniform Resource Locator (URL) of said server;

configuration files located on said server;

a module for sending a configuration request from said client to said server, and wherein said request is resent if a configuration file is not received from said server within a predetermined time limit;

a module for identifying the configuration file associated with said client and located on said server;

a module for sending said configuration file from said server to said client;

a module for configuring various aspects of said client using said configuration file;

a module for allowing users to store their own configuration and preference information on said server from their client, thereby allowing said users to move to different machines and always be able to log in as themselves if they point to that same server;

wherein each configuration file is intended for a specific client or group of clients;

wherein said configuration file allows configuration data to be set dynamically; and wherein said client addresses said server through said URL.

14. The apparatus of claim 13, wherein said identifying module uses a Common Gateway Interface (CGI) file containing CGI script commands to associate said configuration file with said client.

15. The apparatus of claim 13, further comprising:

a module for polling said client for information located on said server;

a module for receiving said client's response from said poll located on said server; and a module for processing said client's response located on said server.

16. The apparatus of claim 13, wherein said configuration file contains file update information.

17. The apparatus of claim 13, wherein said configuration file contains preference and lock file settings.

18. The apparatus of claim 13, further comprising:

a module for processing Lightweight Directory Access Protocol (LDAP) instructions contained in said configuration file located on said client;

a module for requesting information from an LDAP server located on said client across a computer network;

receiving LDAP information from said LDAP server on said client; and a module for processing said LDAP information located on said client.

19. The apparatus of claim 13, further comprising:

a module for setting preferences according to said configuration file located on said client.

20. The apparatus of claim 13, further comprising:

a module for updating files according to said configuration file located on said client.

21. The apparatus of claim 15, further comprising:

a module for receiving said poll from said server located on said client;

a module for processing said poll located on said client; and a module for responding to said poll with said requested information located on said client.

22. The apparatus of claim 13, wherein said configuration file is a Javascript Configuration (JSC) file.

23. The apparatus of claim 13, further comprising:

a module for setting a polling option on said client with a command on said client or in said configuration file.

24. The apparatus of claim 13, wherein said client periodically refreshes said configuration file through a request for said configuration file to said server.

* * * * *